United States Patent
Sandiford et al.

(10) Patent No.: US 8,113,467 B2
(45) Date of Patent: Feb. 14, 2012

(54) OVERPRESSURE PROTECTION FOR AN AIRCRAFT FUEL TANK SYSTEM

(75) Inventors: J. Patrick Sandiford, Bristol (GB); Mark Smiles, Bristol (GB)

(73) Assignee: Airbus Operations Limited, Bristol (GB)

( * ) Notice: Subject to any disclaimer, the term of this patent is extended or adjusted under 35 U.S.C. 154(b) by 853 days.

(21) Appl. No.: 12/116,299

(22) Filed: May 7, 2008

(65) Prior Publication Data
US 2008/0295905 A1 Dec. 4, 2008

(30) Foreign Application Priority Data

May 30, 2007 (GB) .................................. 0710269.2

(51) Int. Cl.
*B64D 37/14* (2006.01)

(52) U.S. Cl. .............. 244/135 R; 137/68.23; 244/135 C

(58) Field of Classification Search .............. 244/135 R, 244/135 B; 137/68.1, 68.23, 68.24
See application file for complete search history.

(56) References Cited

U.S. PATENT DOCUMENTS

| | | | | |
|---|---|---|---|---|
| 3,044,479 A | * | 7/1962 | Meyer et al. ................ | 137/68.23 |
| 3,273,578 A | * | 9/1966 | Clark .......................... | 137/68.14 |
| 4,102,469 A | * | 7/1978 | Shegrud et al. ............. | 220/89.2 |
| 4,479,587 A | * | 10/1984 | Mundt et al. ................ | 220/89.2 |
| 4,590,957 A | * | 5/1986 | McFarlane .................. | 137/68.21 |
| 4,795,051 A | * | 1/1989 | Ou ............................... | 220/89.2 |
| 5,368,180 A | * | 11/1994 | Farwell et al. .............. | 220/89.2 |
| 6,948,515 B2 | * | 9/2005 | Wadkins ..................... | 137/68.23 |
| 6,955,182 B2 | * | 10/2005 | Siimes et al. ............... | 137/68.23 |
| 7,051,751 B2 | * | 5/2006 | Carroll ........................ | 137/68.23 |

OTHER PUBLICATIONS

British Search Report for GB0710269.2 dated Sep. 24, 2007.

* cited by examiner

*Primary Examiner* — Joshua Michener
*Assistant Examiner* — Keith L Dixon
(74) *Attorney, Agent, or Firm* — Lowe, Hauptman, Ham & Berner, LLP

(57) ABSTRACT

An aircraft venting tank (for example a surge tank) has a stack pipe unit. The stack pipe unit comprises first and second portions and houses a frangible overpressure protector element (for example a frangible disc). The stack pipe unit may be arranged to have a fitted configuration in which the first portion of the stack pipe unit is attached to a part of the venting tank structure, the first portion is coupled to the second portion, and the second portion is coupled to another part of the venting tank structure. The first portion may be held in a relationship with the second portion so as to form a seal between the frangible element, and the first and second portions. In a frangible element-replacement configuration the second portion may be coupled to the venting tank structure, such that the frangible overpressure protector element can be replaced without removal of the second portion from the venting tank structure. The venting tank may include a frangible element holder for holding a spare frangible element for use in an overpressure protector unit.

33 Claims, 10 Drawing Sheets

OVERPRESSURE PROTECTION FOR AN AIRCRAFT FUEL TANK SYSTEM

RELATED APPLICATIONS

The present application is based on, and claims priority from, British Application Number 0710269.2, filed May 30, 2007, the disclosure of which is hereby incorporated by reference herein in its entirety.

TECHNICAL FIELD

The present invention relates to overpressure protection for an aircraft fuel tank system. More particularly, but not exclusively, the invention relates to an aircraft venting tank structure having an overpressure protector unit associated therewith, and a method of operating an aircraft comprising such a structure.

BACKGROUND OF THE INVENTION

It is desirable in an aircraft fuel tank system, to have an overpressure protector to relieve excess pressure and prevent the pressure from reaching a dangerous level.

In a fuel tank system, large pressure differentials may occur when, for example: the aircraft is being refuelled (resulting in high pressure in the tank relative to the atmosphere i.e. positive pressure differential); or the aircraft is making an emergency descent (resulting in low pressure in the tank relative to the atmosphere i.e. negative pressure differential). A common type of overpressure protector comprises a frangible disc, the frangible disc being arranged, during use, to inhibit fluid flow through the overpressure protector, but to fail in response to an excessive pressure differential. Using a frangible disc in overpressure protection is desirable as the overpressure protector can be relatively simple, reliable and lightweight.

Such overpressure protection is typically mounted in the surge tank of the fuel tank system on an aircraft and protects the fuel tank system from experiencing excess pressure differentials in the event that, for example, the flame arrestor becomes blocked. In a known arrangement, a frangible disc is received in a stack pipe in the surge tank. Having the frangible disc located in a stack pipe prevents any overspill fuel leaving the surge tank in the event that the disc fails. The stack pipe may also protect the frangible disc, to some extent, from spurious failures caused by vibrations etc. during flight.

This known arrangement is described in detail below with reference to FIGS. 1 and 2a to 2c. In summary, the stack pipe comprises a base portion to which a lid is tightly bolted via a number of bolts in a circular formation. The frangible disc is held between the base portion and the lid and is sealed by the tight fitting of the lid on the base. The lid is covered with a protective mesh, but is otherwise open to the interior of the surge tank.

In the event that the frangible disc in this known overpressure protector needs replacing (for example if it has failed (ruptured), or if it has exceeded its recommended working life) the stack pipe must be removed from the surge tank by disconnecting rivets on an access panel on the underside of the wing, and removing the stack pipe, together with the access panel, from the aircraft. The complete stack pipe/frangible disc assembly is then unbolted from the access panel. The lid is then removed from the base portion, a new frangible disc is inserted into the stack pipe and the lid is then re-attached to the base portion. The bolts attaching the lid to the base are tightened to form a seal between the frangible disc and the stack pipe. The bolts should be tightened in a predetermined sequence with particular torques so that the new disc is held securely in place, but not subjected to excessive compressive forces. Replacing the frangible disc may therefore be relatively expensive and time consuming, and may result in a dispatch delay. In addition, the frangible disc may be damaged by over-tightening the bolts attaching the lid of the stack pipe to the base, or tightening the bolts on one side of the lid earlier than those on another side of the lid.

Another known type of overpressure protector in a surge tank is a spring-loaded overpressure valve which is arranged to open in the event of an excessive pressure differential. Such a spring-loaded overpressure valve tends to be relatively easy to reset after it has been activated, but it does have a number of drawbacks. For example, it can be unduly complex, vulnerable to jamming and/or unduly heavy.

It is therefore preferable to use frangible discs but it would be desirable to make replacement of the disc simpler and quicker.

Another problem that has been identified with certain forms of overpressure protection relates to the fact that specific type of frangible disc may need to be fitted for specific applications (for example the disc may need to be a particular size or have a particular pressure rating). When a new frangible disc is to be fitted, significant delays can be caused if the replacement disc is not readily available (as may be the case if, for example, the aircraft has landed at a relatively remote airport, but is approaching the end of its permitted flight time for flying with a broken frangible disc).

SUMMARY OF THE INVENTION

Embodiments of the present invention seek to mitigate or remove at least one of the above-mentioned problems.

According to a first aspect of the present invention, there is provided an aircraft venting tank structure having a stack pipe unit associated therewith, wherein the stack pipe unit comprises a first portion and a second portion, and the stack pipe unit houses a frangible overpressure protector element, the frangible overpressure protector element being arranged, during use, to inhibit fluid flow through the stack pipe unit, but to fail in response to an excessive pressure differential, and wherein the stack pipe unit is arranged to have (i) a fitted configuration in which the first portion is attached to the venting tank structure, and the first and second portions are coupled to each other and (ii) a frangible element-replacement configuration in which the second portion is coupled to the venting tank structure and the first portion is de-coupled from the second portion, such that the frangible overpressure protector element can be replaced without removal of the second portion from the venting tank structure.

There is also provided a method of removing a frangible overpressure protector element from a stack pipe unit in a venting tank, the stack pipe unit comprising a first portion and a second portion, the method comprising the steps of:

separating the first portion of the stack pipe unit from the second portion of the stack pipe unit, moving the first portion to a replacement configuration in which the frangible element may be removed, whilst the second portion of the stack pipe unit remains in the interior of the venting tank, and removing the frangible overpressure protector element from the stack pipe unit.

By eliminating the need to remove all of the stack pipe unit from the venting tank, it may be possible to replace a frangible element in the stack pipe unit without needing to remove an access panel and/or without requiring fuel tank entry. This can enable the frangible element to be replaced relatively quickly and cheaply.

According to another aspect of the invention, there is provided an aircraft venting tank structure having a stack pipe unit associated therewith, wherein the stack pipe unit comprises a first portion and a second portion, and the stack pipe unit houses a frangible overpressure protector element, the frangible overpressure protector element being arranged, during use, to inhibit fluid flow through the stack pipe unit, but to fail in response to an excessive pressure differential, and wherein the stack pipe unit is arranged to have:
(i) a frangible element-replacement configuration in which the first portion of the stack pipe is de-coupled from the second portion of the stack pipe such that the frangible overpressure protector element can be replaced, and
(ii) a fitted configuration in which the first portion of the stack pipe unit is attached to a part of the venting tank structure, the first portion is coupled to the second portion, and the second portion is coupled to another part of the venting tank structure,
the stack pipe unit being arranged such that when the stack pipe unit is in the fitted configuration, the first portion is held in a relationship with the second portion so as to form a seal between the frangible overpressure protector element, and the first and second portions.

There is also provided a method of fitting a frangible overpressure protector element in a stack pipe unit in a venting tank, the stack pipe unit comprising a first portion and a second portion, the method comprising the steps of:
locating the frangible overpressure element in the stack pipe unit,
bringing the first and second portions of the stack pipe unit together to a fitted configuration in which the frangible overpressure protector element is arranged to inhibit fluid flow through the stack pipe unit, but to fail in response to an excessive pressure differential,
the step of bringing the first and second portions together forming a seal between the frangible overpressure protector element and the first and second portions, the seal being formed whilst the frangible overpressure protector element is inside the venting tank structure.

A seal between the frangible element and the stack pipe unit may thereby be formed reliably and quickly. The risk of the frangible element being damaged during fitting may also be reduced. Furthermore it may be possible to replace a frangible element in the stack pipe unit without requiring fuel tank entry. This may reduce aircraft downtime, cost and/or avoid dispatch delays.

According to yet another aspect of the invention there is provided an overpressure protector unit for an aircraft, the overpressure protector unit being arranged to receive a frangible element for inhibiting fluid flow through the overpressure protector, but for failing in response to an excessive pressure differential, and wherein the overpressure protector unit further comprises a frangible element holder for holding a spare frangible element for use in the overpressure protector unit.

There is also provided a method of operating an aircraft having a venting tank structure and an overpressure protector unit associated with the venting tank structure, the method comprising the step of providing a spare frangible element in the venting tank structure, the spare frangible element being for use in the overpressure protector unit.

By providing a spare frangible element in the venting tank structure, a replacement frangible element may be readily available in the event that a frangible element in the overpressure protector needs replacing. Thus, undesirable delays caused by a replacement frangible disc not being readily available may be reduced. This can enable the frangible element to be replaced relatively quickly and cheaply. This may also reduce the potential for fitting an incorrect replacement frangible disc as the spare unit can be carefully checked before being installed as a spare, rather than being replaced under severe time constraints following pre-dispatch checks.

DESCRIPTION OF THE DRAWINGS

Various embodiments of the invention will now be described, by way of example only, with reference to the accompanying schematic drawings of which.

DETAILED DESCRIPTION

FIGS. 1, 2a, 2b and 2c show a perspective view of a known stack pipe unit 1001 in an aircraft surge tank 1003. The stack pipe unit 1001 comprises base portion 1005 and a lid 1011. The base portion is attached to an access panel 1007 riveted to, and forming part of, the lower surface of the surge tank 1003 (shown most clearly in FIG. 2c). The base portion 1005 is hollow and opens to the atmosphere through a hole in the access panel 1007.

The upper end of the stack pipe base portion 1005 includes a flange 1009 onto which the lid 1011 is received. The lid 1011 is primarily defined by a frustro conical mesh structure 1013, having a solid flange 1015 for cooperating with the flange 1009 on the stack pipe base 1005. The lid 1011 is firmly attached to the base 1005 by a series of bolts spaced around the cooperating flanges 1009, 1015.

The stack pipe unit, when fitted, extends upwardly from the base of the surge tank 1003 towards the upper wall of the surge tank. The stack pipe thereby prevents any overspill fuel leaving the surge tank in the event that the disc fails.

A frangible disc 1017 (shown by a shaded area in a partial cut-away view in FIG. 1) is located between the lid 1011 and the base portion 1005 of the stack pipe. The bolts attaching the lid to the stack pipe base are tightened such that a seal is formed between the stack pipe unit and the disc 1017. The frangible disc 1017, which is made of carbon, is therefore sealed so as to inhibit airflow through the stack pipe unit 1001, but is also arranged to shatter when an excessive pressure differential (positive or negative) is experienced across the disc thereby allowing the surge tank 1003 to vent to atmosphere. Thus the aircraft is protected from excessive pressure differentials in the surge tank.

Figure 1:
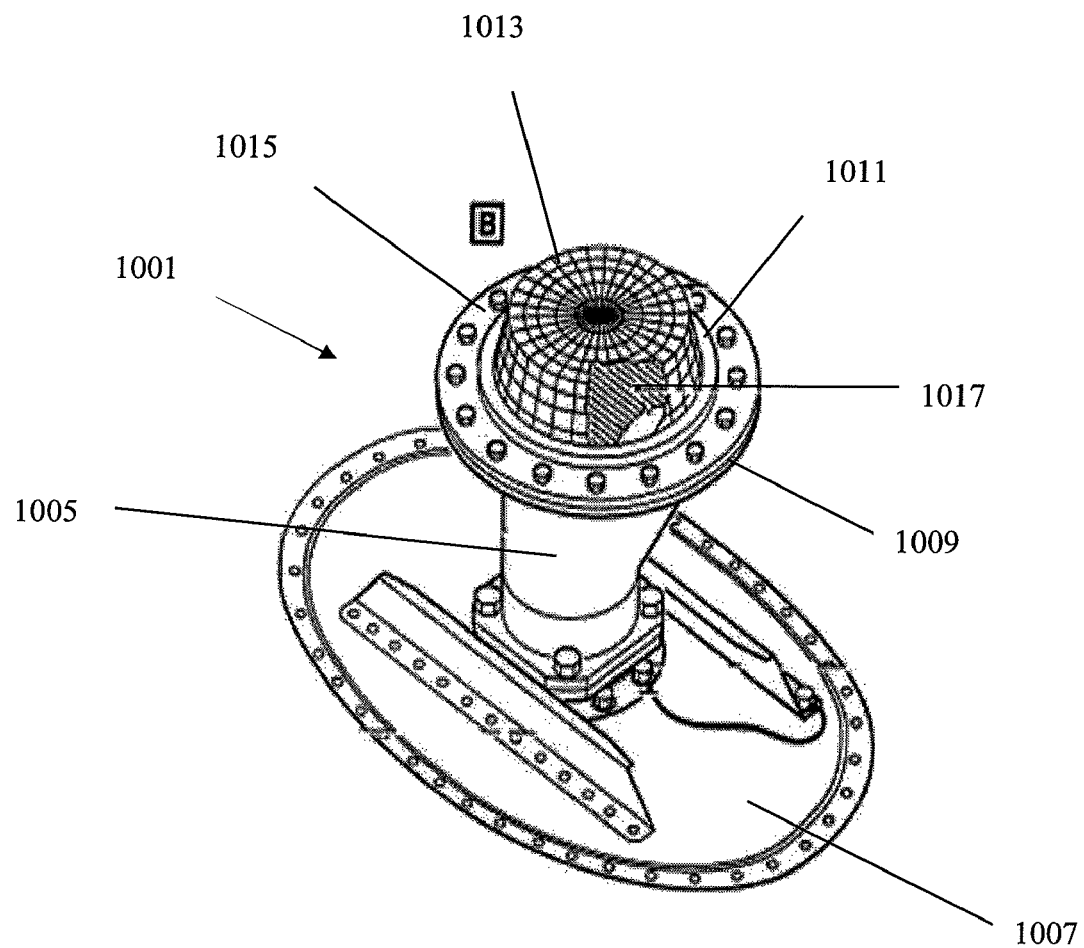
FIG. 1 is a perspective view of a known overpressure protector in a surge tank.
Figures 2A, 2B, 2C:
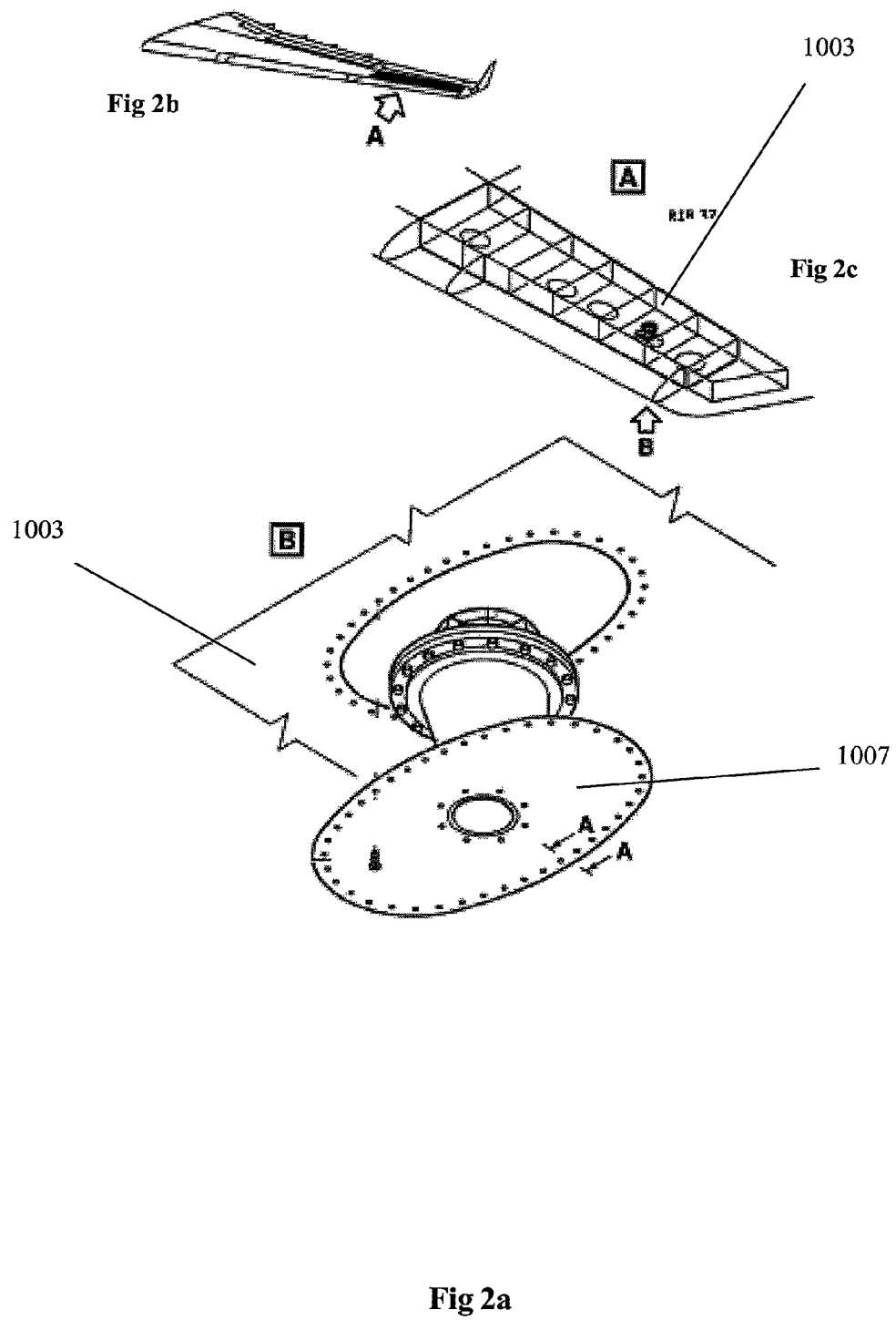
FIGS. 2a to 2c are views of the known overpressure protector of FIG. 1, being fitted to an aircraft surge tank.

In the event that the frangible disc 1017 needs replacing, it is necessary for an engineer to detach the access panel 1007 from the underside of the surge tank 1003 and remove the entire stack pipe unit 1001 from the surge tank (as shown in FIG. 2a). Removing the access panel 1007 tends to be deemed a fuel tank entry for the purposes of aircraft safety (at least for the purposes of aircraft safety certification, although the engineer does not necessarily need to enter the tank itself). Thus the fuel tank needs to be vented, the aircraft may need to be taken to a hanger, and specialist engineers may be required to perform the job. Replacing the frangible disc 1017 may therefore be relatively expensive and time consuming.

In addition, the frangible disc 1017 can be damaged if not installed correctly for example by over-tightening the bolts attaching the lid 1011 to the stack pipe base portion 1005, or tightening the bolts on one side of the lid 1011 earlier than those on another side of the lid 1011.

Figure 3:
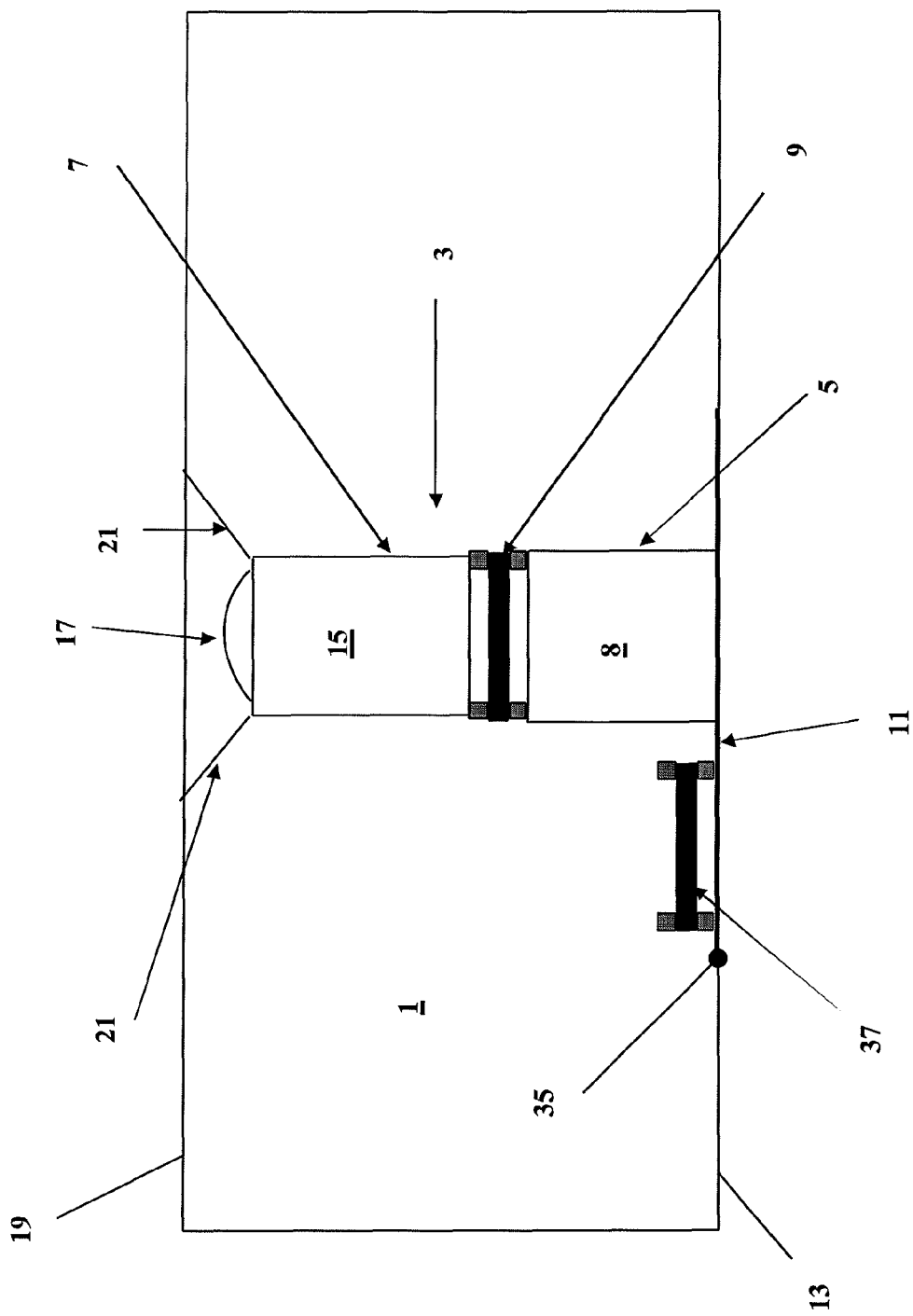
FIG. 3 is a schematic drawing showing a venting tank structure according to a first embodiment of the invention in which a stack pipe unit is in a fitted configuration.

FIG. 3 is a schematic drawing showing an aircraft venting tank structure 1 according to a first embodiment of the invention. In the first embodiment the venting tank is a surge tank. FIG. 3 shows the surge tank when viewed side-on from the tip of the aircraft wing (not shown) in which the surge tank is located. The surge tank contains a stack pipe unit 3 which, in FIG. 3, is shown in a fitted configuration. The stack pipe unit 3 comprises a first, lower, portion 5 and a second, upper, portion 7, and houses a frangible disc element 9 located between the upper and lower portions 7, 5.

The lower portion 5 of the stack pipe unit 3 has a cylindrical metal pipe section 8 joined to, and extending perpendicularly from, a small panel section 11. The panel is generally rectangular and is smaller than the access panels (not shown) on the wing. The panel 11 and has a circular hole in it where the pipe section 8 is joined, such that the lower end of the pipe section 8 is open to the atmosphere. The panel section 11 (forming part of the lower portion of a stack pipe unit) is itself coupled to the lower wall 13 of the surge tank structure, by way of being attached with a series of lockable catches (not shown) around three edges of the panel 11. The other edge of the panel 11 (the foremost edge on the aircraft) is attached to the lower wall 13 of the surge tank 1 at a hinge 35 and is arranged to pivot about the hinge 35 when the catches are released. The catches and hinge 35 are such that when the stack pipe unit 3 is in the fitted configuration (shown in FIG. 3), the lower portion 5 is sealed against the lower wall 13 to prevent fluid leakage from the fuel tank.

The upper portion 7 of the stack pipe unit 3 comprises a metal pipe section 15 of similar size to the pipe section 8 of the lower portion 3. This pipe section 15 is covered at its top end by a dome-shaped mesh structure 17 to prevent foreign bodies (such as debris from a broken frangible disc) leaving the stack pipe unit 3, but to allow airflow between the surge tank 1 and the stack pipe unit 3. The upper portion 7 of the stack pipe unit is suspended from the upper wall 19 of the surge tank 1 on four equally spaced metallic arms 21 (only two of which are shown in FIG. 3) which extend from the top end of the pipe section 15. The arms 21 are riveted to the surge tank upper wall 19 such that the upper portion 7 of the stack pipe unit 3 is rigidly coupled to the surge tank structure 1.

It will be appreciated that since the mesh structure 17 is raised above the lower wall 13 of the surge tank, the stack pipe unit prevents any overspill fuel from leaving the surge tank in the event that the frangible disc element 9 fails. The stack pipe unit also protects the frangible disc, to some extent, from spurious failures that might be caused by vibrations etc. during flight.

Figure 4:
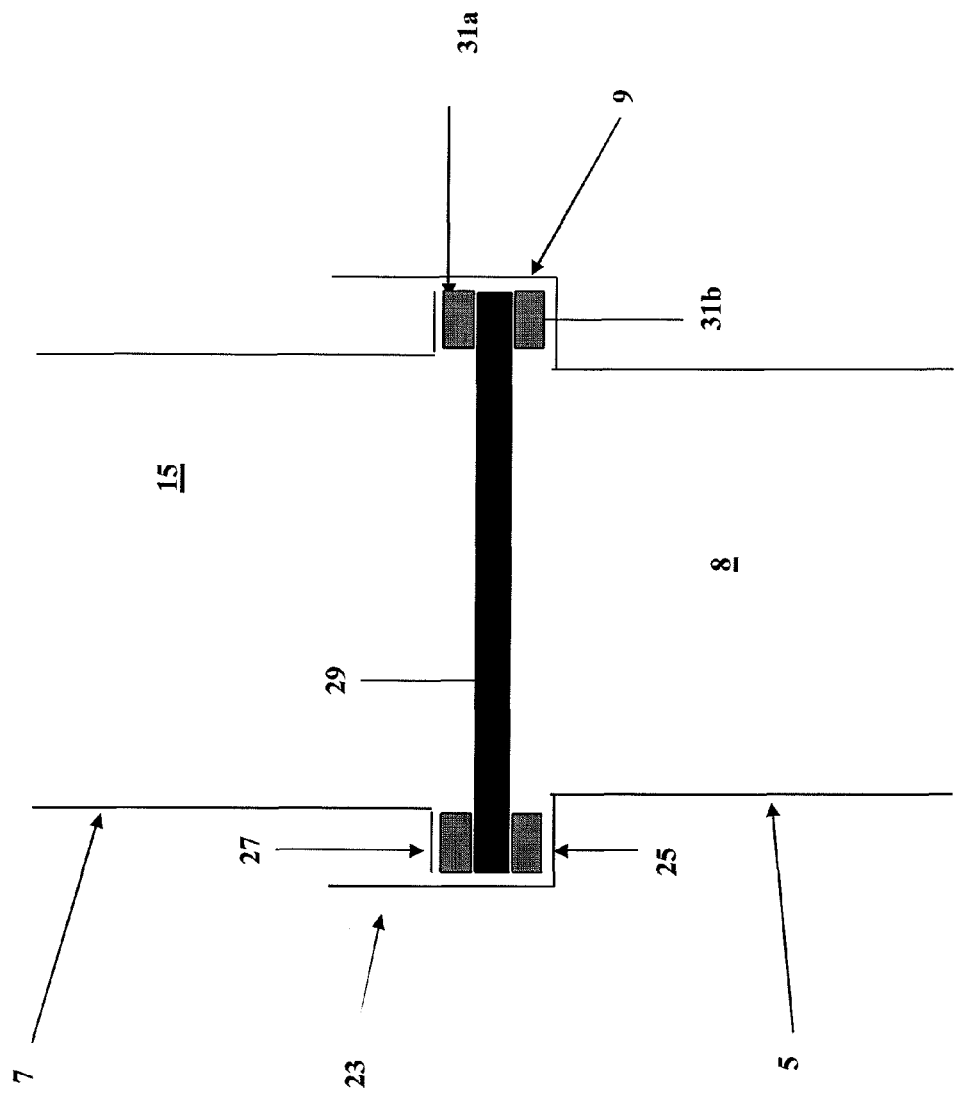
FIG. 4 is a close-up of the junction between the first and second portions of the stack pipe unit in the first embodiment of the invention.

In the fitted configuration shown in FIG. 3, not only are the upper and lower portions 7, 5 attached to the surge tank structure 1, they are also coupled together. Referring now to FIG. 4, which shows the junction between the upper and lower portions 7, 5 in more detail, the top end of the lower portion 5 of the stack pipe unit 3 has a flared region 23 of increased diameter, which extends from a radially extending flange 25 on the pipe section 8. The bottom end of the upper stack pipe unit includes a corresponding radial flange 27, of only a slightly smaller diameter than the flared region 23 of the lower portion 5. The upper portion 5 of the stack pipe unit 3 is axially aligned with the lower portion 5 and the circular flange 27 is received in the flared region 23 of the lower portion 5 of the stack pipe thereby restricting radial movement of the upper and lower sections 7, 5 relative to one another. In this embodiment, the upper and lower sections do not physically touch each other when coupled together (when sealed with the frangible disc element 9, as shown in FIG. 4—see below). The upper and lower sections 7, 5 when so coupled together provide a channel for fluid flow into and out of the surge tank in the event of failure of the disc.

Figure 5:
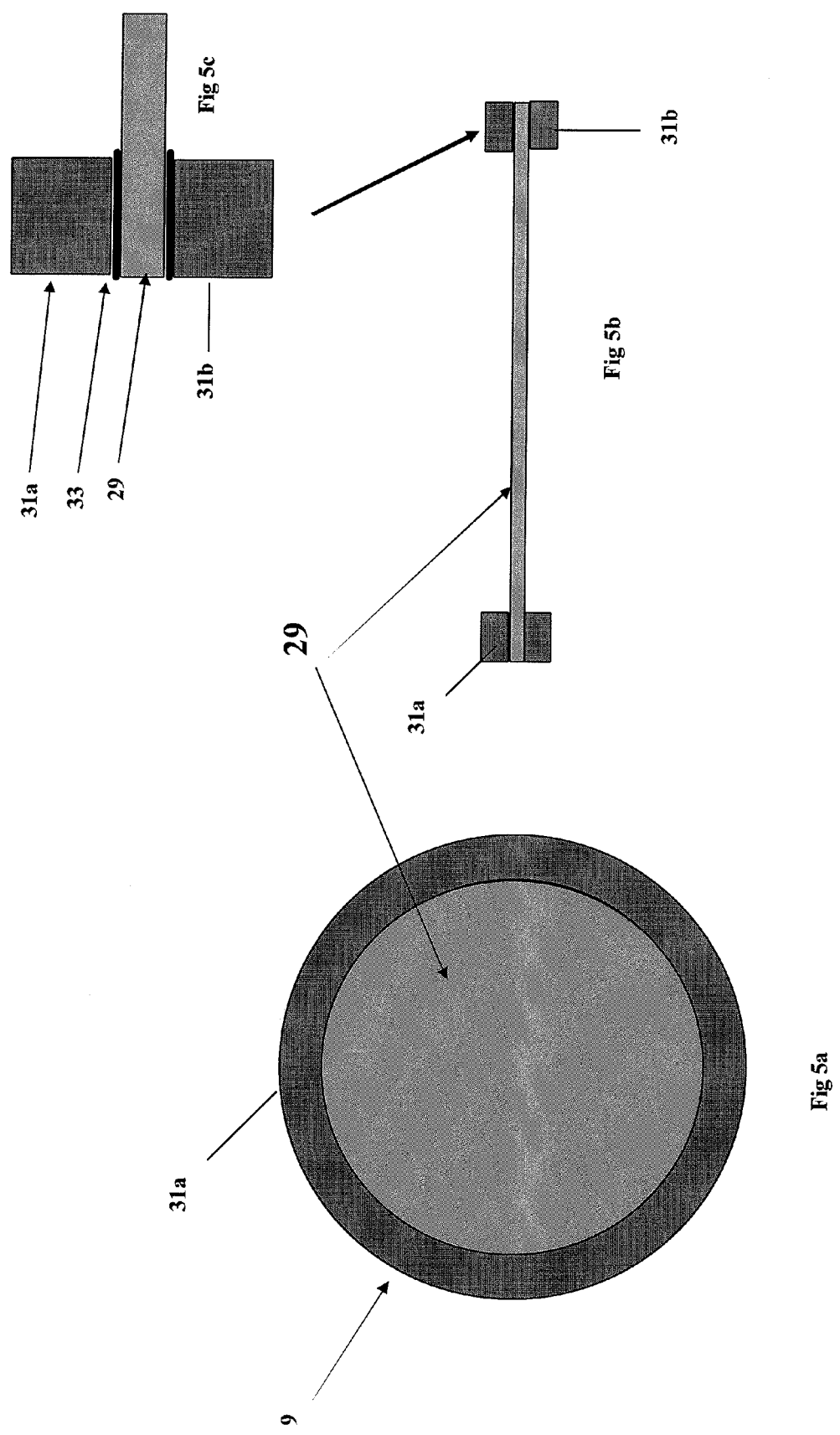
FIGS. 5a to 5c are views of a frangible disc element for use in the stack pipe arrangement according to the first embodiment of the invention.

The frangible disc element 9 is sandwiched between the radially-extending flanges 25, 27 on the top of the lower stack pipe portion 5 and on the bottom of the upper stack pipe portion 7. The frangible disc element 9, which is shown in detail in FIGS. 5a to 5c, comprises a carbon frangible disc 29 and two annular rubber seals 31a, 31b (one on the upper surface of the disc and one on the lower surface of the disc). Each of the seals 31a, 31b is associated with a thin metallic ring 33 for reinforcing the frangible disc.

The stack pipe unit 3 is arranged such that when the upper and lower portions 7, 5 are brought together to the fitted configuration, the rubber seals 31a, 31b are deformed under the influence of a compressive force along the longitudinal axes of the upper and lower pipe sections 15, 9 so as to form a seal and the disc element thus acts as a barrier to fluid flow between the two portions of the stack pipe unit 1.

The carbon frangible disc 29 is arranged to fail (shatter) at a positive pressure differential of +9 psi (62.0 kN/m$^2$) and a negative pressure differential of −6 psi (41.3 kN/m$^2$). The frangible disc element 9 is therefore arranged to inhibit fluid flow through the stack pipe unit 3 (and therefore into and out of the surge tank 1) during conventional operating conditions, but is arranged to fail in response to an excessive pressure differential (which might occur in the unlikely event that, for example, a flame arrestor in the surge tank becomes blocked).

Figure 6:
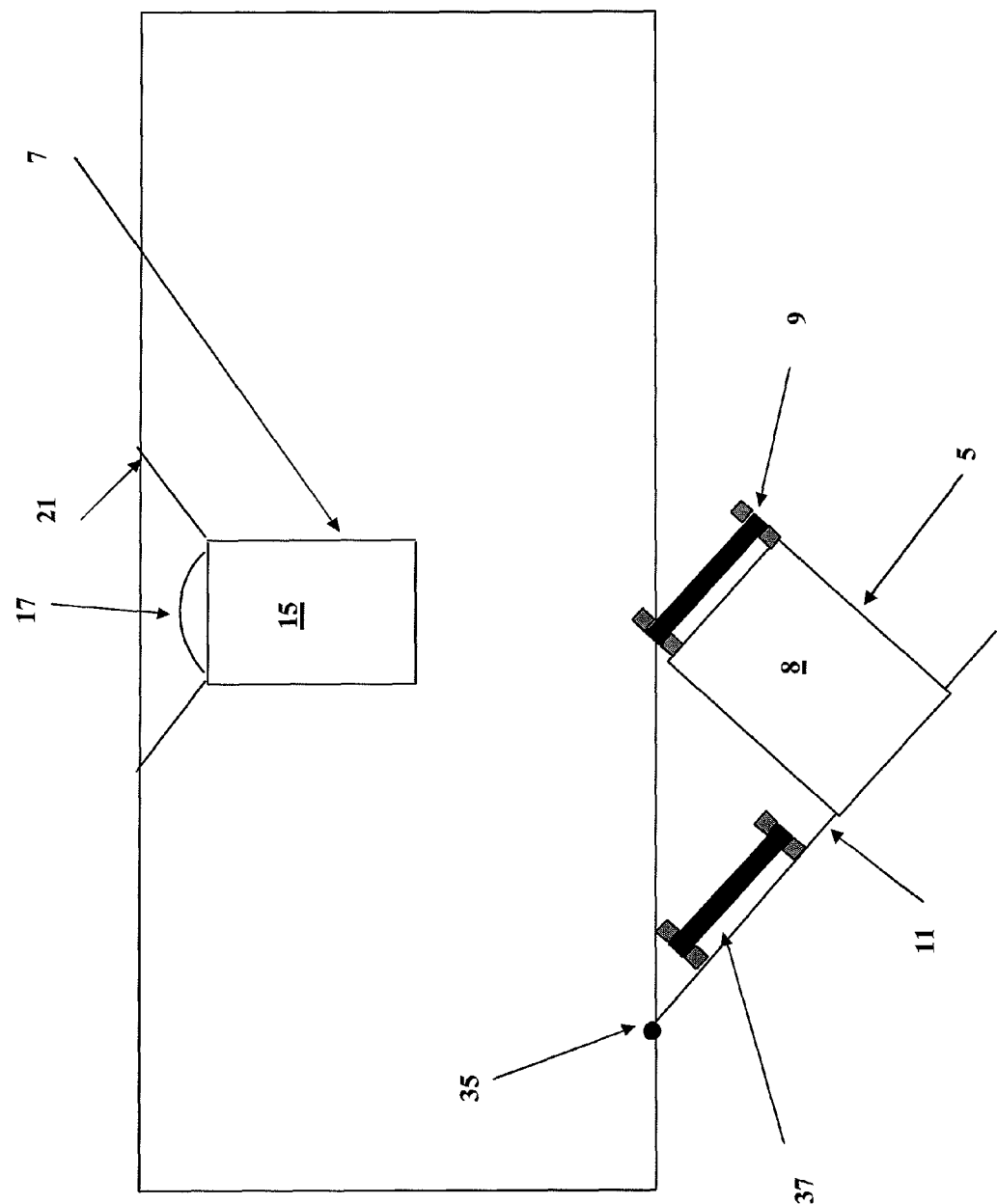
FIG. 6 is a schematic drawing showing the venting tank structure according to the first embodiment of the invention in which the stack pipe unit is in a frangible element-replacement configuration.
Figure 7:
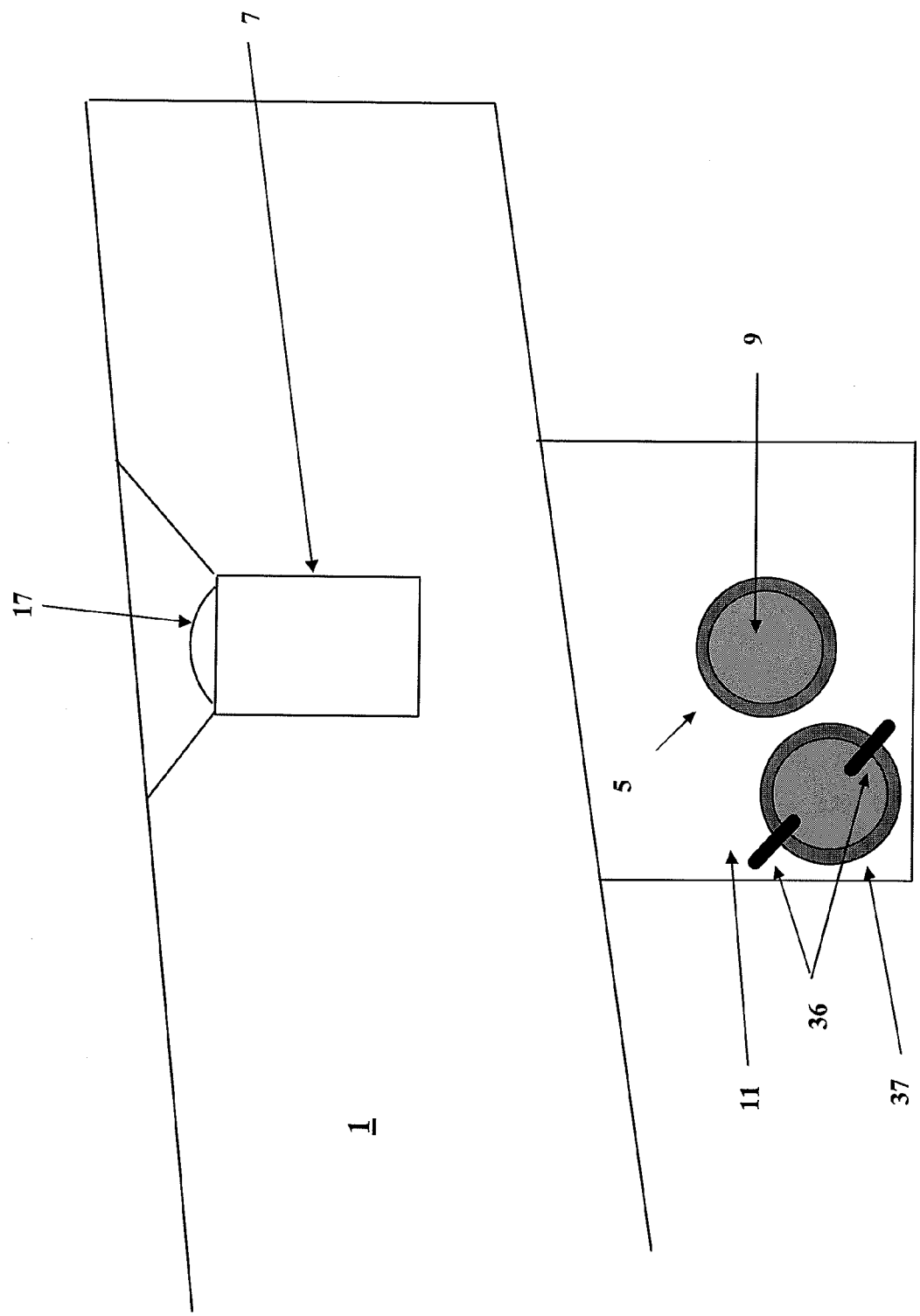
FIG. 7 is a schematic drawing showing the venting tank structure of FIG. 6 as viewed from the rear of the aircraft.

By unlocking the catches and lowering the lower portion about the hinge 35, the lower portion 5 of the stack pipe unit 3 can be moved from the fitted configuration (shown in FIGS. 3 and 4) to a disc-replacement configuration (shown in FIGS. 6 and 7).

Referring now to FIGS. 6 and 7, in the disc-replacement configuration, the lower portion 5 is pivoted about the hinge 35 and de-coupled from the upper portion 7 of the stack pipe unit 1, thereby removing the compressive force acting to deform the seals 31a, 31b of the frangible disc element 9. The upper portion 7 of the stack pipe unit is rigidly held inside the surge tank, and the frangible disc element 9 therefore drops away from the upper portion 7 as the lower portion 5 is pivoted downwardly. The stack pipe unit is arranged such that the frangible disc element 9 is associated with the lower portion by being loosely retained in the flared pipe region 23 at the top of the lower pipe portion 8.

In the disc-replacement configuration, the lower portion 5 of the stack pipe is pivoted sufficiently far about the hinge 35 that it is located outside the interior of the surge tank 1. The frangible disc element 9 can thus be easily removed from the lower portion 5 and replaced with a new disc element, without removing the upper portion 7 from the surge tank.

To re-fit the disc, the lower portion 5 is pivoted upwardly about the hinge 35 and fully re-attached to the surge tank structure 1 with the catches, thereby adopting the fitted configuration of FIGS. 3 and 4. The upper and lower portions 7, 5 are thus re-coupled together, and the rubber seals 31a, 31b of the new disc are deformed under the influence of the compressive force along the longitudinal axes of the upper and lower pipe sections 7, 5 (generated as the lower portion 5 is urged towards the fixed upper portion 7. This forms a seal between the disc element and the two portions of the stack pipe unit 3 whilst the disc element is inside the surge tank.

The surge tank 1 of the first embodiment of the invention has a number of advantages. Firstly, since the upper portion 7 of the stack pipe unit remains attached to the upper wall 19 of the surge tank 1 when the stack pipe is in the replacement configuration, the act of replacing the frangible disc element 9 can be less obtrusive than some previous known arrangements (such as that discussed with respect to FIGS. 1 and 2a-c). In the first embodiment of the invention, replacing the disc element does not require removal of an access panel. The disc element 9 may be replaced relatively quickly and efficiently thereby saving aircraft downtime, cost and dispatch delays (in the first embodiment of the invention, the disc can be replaced within 15 minutes).

In addition, since the upper portion 7 of the stack pipe unit is coupled to the upper wall 19 of the surge tank so as to prevent movement relative to that upper surface, the lower portion 5 can be attached to the surge tank 1 and held in a relationship with the upper portion 7 so as to form a seal between the frangible disc element 9, and the upper and lower portions 7, 5 whilst the disc is inside the surge tank. This provides a quick and simple way of forming a reliable seal around the frangible disc, and reduces the chances of the frangible disc being damaged due to over-tightening.

The stack pipe unit in the first embodiment of the invention is also provided with a disc holder for holding a spare frangible disc element 37 for use in the stack pipe unit 1. The disc holder (only in FIG. 7 shown) is located on the lower portion 5 of the stack pipe unit 3 and comprises two resilient metal arms 36 which are arranged to hold the spare disc element 37 firmly against the thin panel of the lower portion of the stack pipe. As shown in FIG. 3, in the first embodiment, a single spare disc element 37 is mounted in the disc holder on the panel 11 of the lower portion 5 of the stack pipe unit 3. Since the spare disc element 37 is mounted on the lower portion 5, it is readily accessible when the stack pipe is arranged in the disc-replacement configuration.

A replacement frangible disc is thus readily available in the event that a frangible element in the stack pipe unit needs replacing. Thus, undesirable delays caused by a replacement frangible disc not being readily available are reduced. This can enable the frangible element to be replaced relatively quickly and cheaply.

Figure 8:
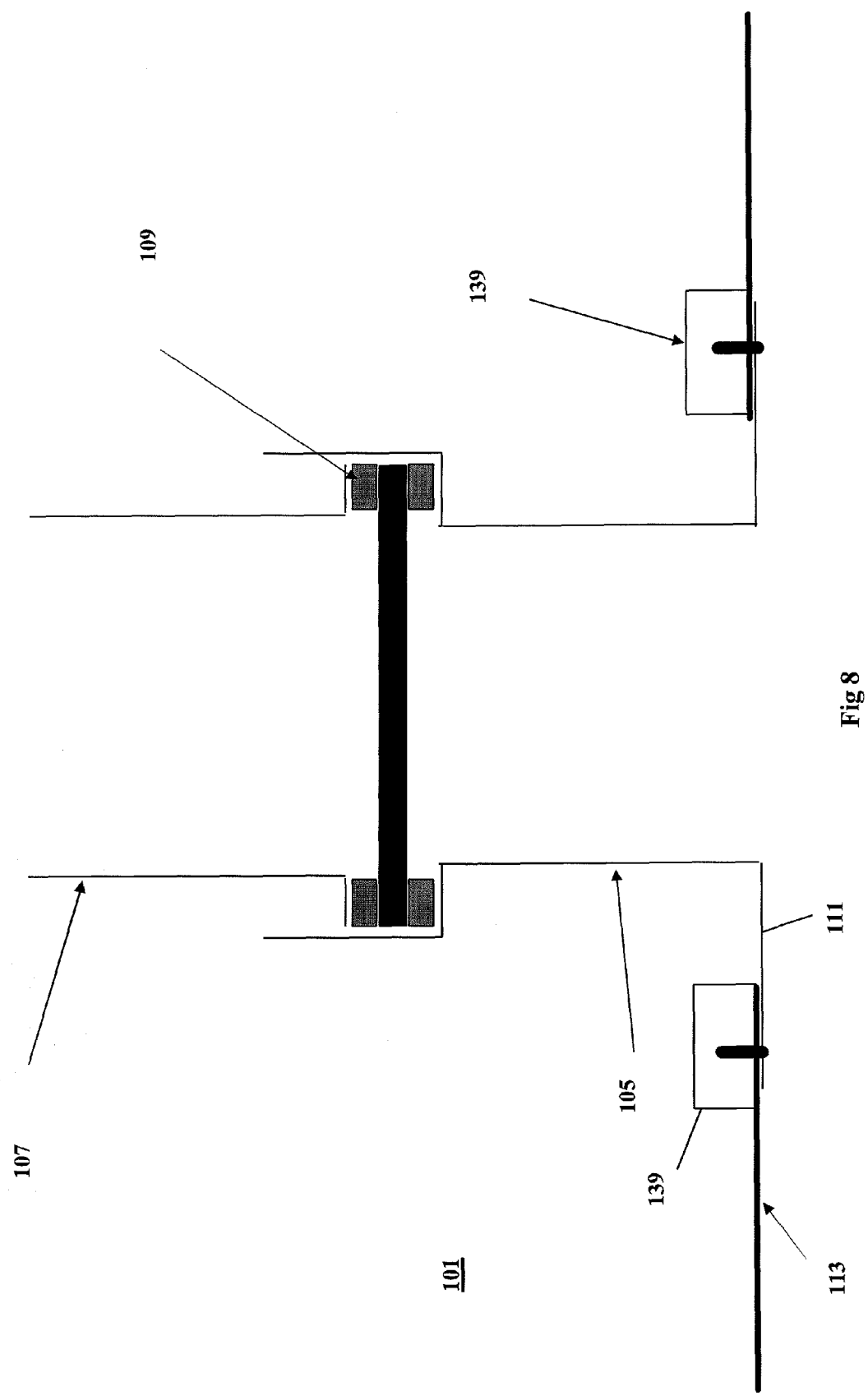
FIG. 8 is a schematic drawing showing a stack pipe unit in a surge tank structure according to a second embodiment of the invention in which a stack pipe unit is in a fitted configuration.
Figure 9:
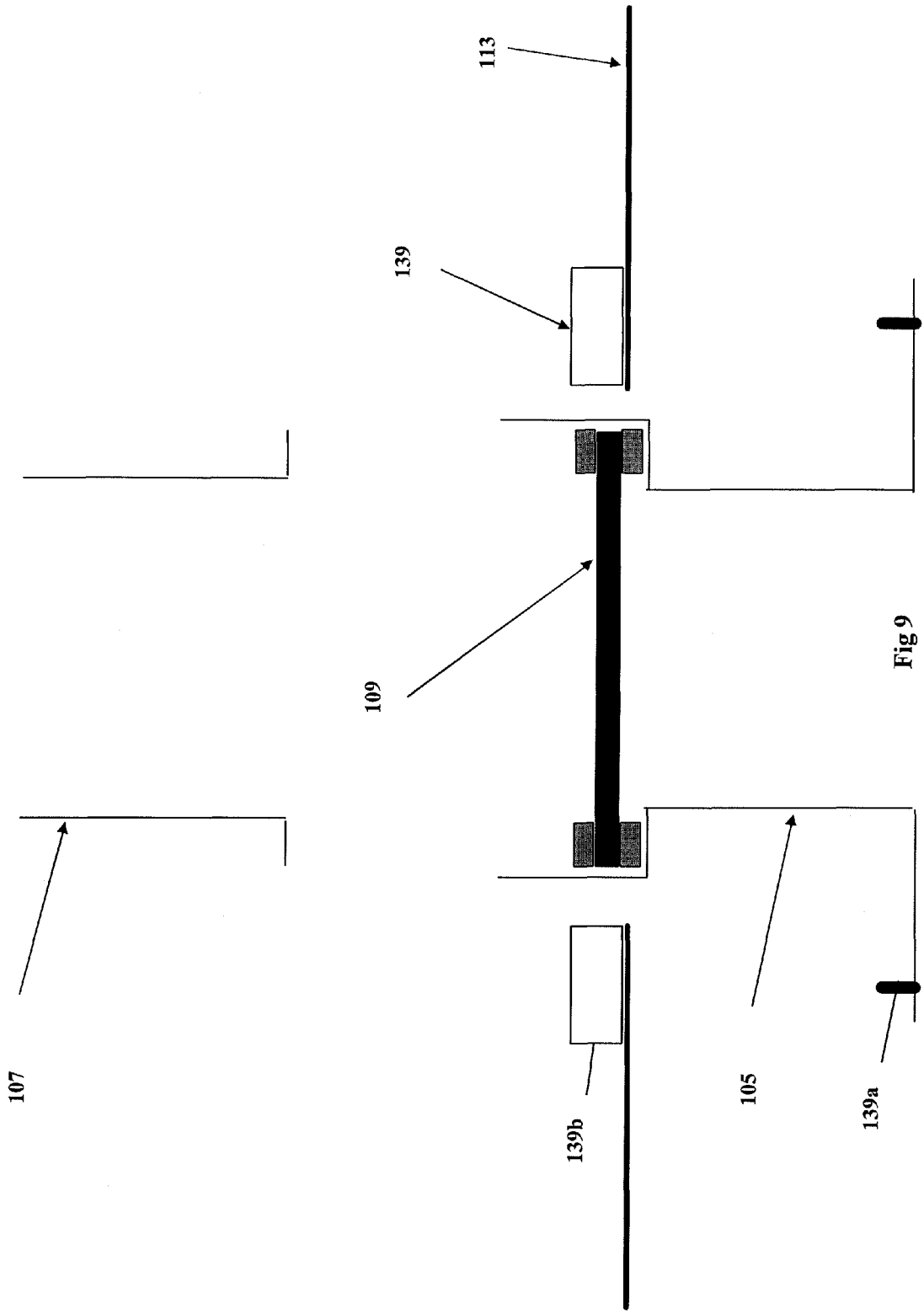
FIG. 9 is a schematic drawing showing the surge tank structure according to the second embodiment of the invention in which the stack pipe unit is in a frangible element-replacement configuration.

FIGS. 8 and 9 show a close-up view of a stack pipe unit 103 in a surge tank 101 according to a second embodiment of the invention. Features in the second embodiment of the invention that correspond to similar features in the first embodiment of the invention, are shown with the same reference numerals as in the first embodiment, but with the addition of the prefix '10' (or '1' where appropriate).

The stack pipe unit 103 is broadly similar to the first embodiment except for differences described below. Firstly, the lower portion 105 of the stack pipe unit 103 is not pivotably mounted on the lower surface 113 of the surge tank structure and is instead attachable by a series of fasteners 139 located around the edge of the panel 111 on the lower portion 105, which allows the lower portion 105 to be fully detached from the surge tank 101. The fasteners are in the form of bayonet-type fittings (the male part 139a of the fitting being located on the lower portion 105 of the surge tank structure and the female part 139b being located in the inner surface of the lower wall 113 of the surge tank 101). The panel 111 is generally circular rather than rectangular to aid the fitting of the lower stack pipe portion 105.

By pushing and twisting the lower portion to release the bayonet-fitting, the stack pipe unit 103 can be lowered from the fitted configuration (shown in FIG. 8) to a disc-replacement configuration (shown in FIG. 9) in which the lower portion 105 of the stack pipe unit is completely separated from the surge tank 1 and the frangible disc element 109 is exposed in the top of the lower stack pipe portion 105. The disc can therefore be easily replaced without requiring the additional step of removing the upper portion 107.

The bayonet-fittings 139 are also such that when the lower portion 105 is attached to the surge tank (by pushing the lower portion upwards and twisting to engage the bayonet fittings), the lower portion 105 is urged against the upper portion 107 and the frangible disc element 109 is held in a press-fit so as to form a seal between the disc and the pipe unit. The seal is therefore quickly and reliably formed, without risk of being over-tightened.

In the second embodiment of the invention the upper portion 107 of the stack pipe unit 103 is coupled to the surge tank by means of being integrally formed with the surge tank structure 101. Thus the upper portion remains coupled to the surge tank 101 in both the fitted and replacement configurations.

Figure 10:
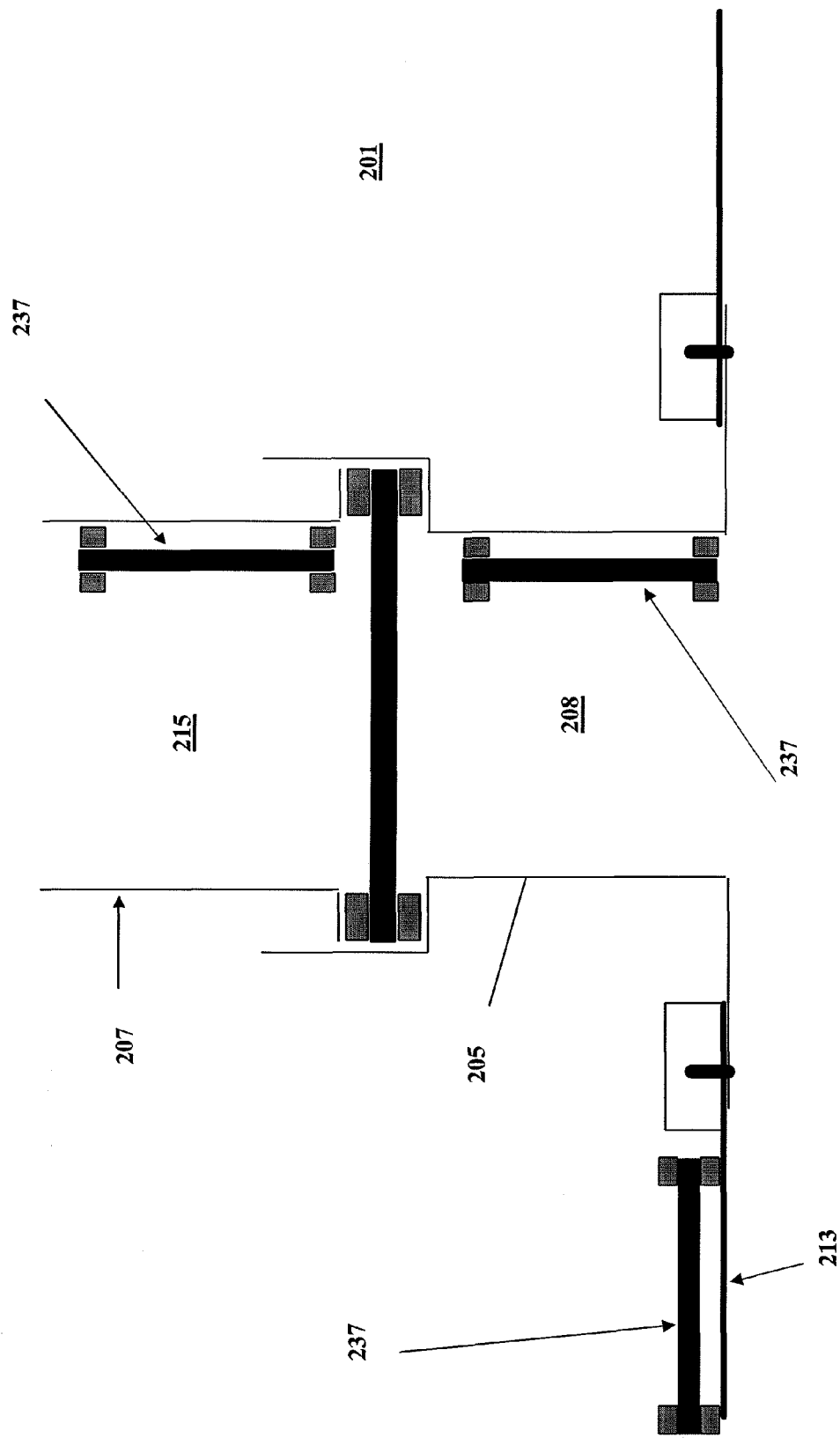
FIG. 10 is a schematic drawing showing a stack pipe unit in a surge tank structure according to a third embodiment of the invention in which a stack pipe unit is in a fitted configuration.

FIG. 10 shows a stack pipe unit 203 on a surge tank 201 according to a third embodiment of the invention. Features in the third embodiment of the invention that correspond to similar features in the first embodiment of the invention, are shown with the same reference numerals as in the first embodiment, but with the addition of the prefix '20' (or '2' where appropriate).

In the third embodiment, the stack pipe unit 203 is similar to that of the second embodiment except that the surge tank 201 has been provided with three spare frangible disc holders: a first holder is positioned on the lower, inner, surface 213 of the surge tank 201 and remains in the surge tank 201 when the lower portion 205 of the stack pipe unit 203 is detached from the surge tank 201; a second holder is mounted on the stack pipe unit by being positioned on the interior of the pipe section 208 in the lower portion 205; and a third holder is mounted on the stack pipe unit by being positioned on the interior of the pipe section 215 in the upper holder 207. Each holder comprises a pair of elastic cords (not shown) which firmly hold a spare disc 237 in place. In the third embodiment of the invention, only one of the holders contains a spare disc at any one time (a disc is shown in each holder in FIG. 10 for illustrative purposes only). Depending on installation constraints any one of the three spare disc holder positions could be used.

Whilst the present invention has been described and illustrated with reference to particular embodiments, it will be appreciated by those of ordinary skill in the art that the invention lends itself to many different variations not specifically illustrated herein.

By way of example another embodiment of the invention (not shown), is similar to the second embodiment of the invention except that the upper stack pipe portion is not riveted to the surge tank structure via the four arms. Instead the upper pipe portion is slightly longer than that in the first embodiment, and the stack pipe unit is arranged such that, when the stack pipe unit is in the fitted configuration, the upper portion is held in place and coupled to the surge tank structure by way of a press-fit between the surge tank upper wall and the lower portion of the stack pipe unit. This arrangement ensures that a quick and reliable seal is formed around the frangible disc whilst it is located in the surge tank, as soon as the lower portion is attached to the surge tank structure via the bayonet fitting.

When the disc needs replacing, the lower portion is twisted and detached from the surge tank and lowered away from the surge tank, such that the unit moves towards the disc-replacement configuration. The compressive force holding the upper stack pipe portion is thereby removed. The upper portion therefore comes outside the surge tank together with the lower pipe portion (it is loosely held by the flared region on the lower pipe section), and it can be lifted off the lower pipe portion. A disc-replacement configuration, in which the upper and lower portions are de-coupled and the disc can be readily replaced, can therefore be adopted.

When the stack pipe unit is to be returned to the fitted configuration, the upper stack pipe portion is placed in the flared region of the lower stack pipe section, and the lower portion in pressed upwardly and fully attached to the surge tank lower wall via the bayonet fitting. The upper portion of the stack pipe is sufficiently retained in the flared region that is does not require additional support during movement to the fitted configuration.

In yet another embodiment of the invention (not shown), an aircraft venting tank includes an overpressure protector unit comprising an overpressure protector which has frangible disc for inhibiting fluid flow through the overpressure protector, but for failing in response to an excessive pressure differential. The overpressure protector unit also includes a frangible disc holder positioned on the interior surface of the lower wall of the surge tank. The frangible disc holder contains a frangible disc of correct size and pressure rating for use in the overpressure protector. A spare disc is therefore readily available in the event the frangible disc needs replacing.

In some of the above-described embodiments of the invention, the frangible disc element is provided with integral seals. It will be appreciated however that in other embodiments of the invention (not shown) the seals may be provided elsewhere (for example, the radial flanges on the upper and lower pipe sections could each have a rubber O-ring attached to them). In which case, only a frangible disc itself would need to be replaced, or provided as a spare.

Although in the above-mentioned embodiments of the invention, the lower portion of the stack pipe unit is moveable and the top portion is fixed, the invention is equally applicable in the situation where the upper portion is moveable (for example being pivotably mounted on the surge tank, or fully detachable from the surge tank) and the lower portion is fixed.

In the first to third embodiments of the invention, the stack pipe unit generally includes two cooperating cylindrical pipe sections. Other stack pipe units which function as stack pipes but which look, or are assembled differently, can, of course, be envisaged. The stack pipe unit need not necessarily be vertical. The stack pipe unit need not necessarily be rigid. The stack pipe unit is preferably in fluid communication with an upper region of the venting tank (above the level at which overspill fuel may have collected). The stack pipe is preferably also in fluid communication, at its other end, with the atmosphere.

In above-described embodiments of the invention, the lower portion of the stack pipe unit is attachable to the surge tank structure via a series of fasteners. It will of course be appreciated that other attachment means may be employed. For example, the lower portion of the stack pipe unit may be screwed onto the surge tank structure.

Of course, features described with reference to one particular embodiment of the invention may be equally applicable to other embodiments on the invention.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

The invention claimed is:

1. An aircraft venting tank structure comprising a surge tank having a stack pipe unit associated therewith, wherein
the stack pipe unit comprises a lower portion and an upper portion, and the stack pipe unit houses a frangible overpressure protector element, the frangible overpressure protector element being arranged, during use, to inhibit fluid flow through the stack pipe unit, but to fail in response to an excessive pressure differential,
and wherein
the stack pipe unit is arranged to have
(i) a fitted configuration in which the lower portion is attached to the surge tank and extends upwardly from a panel section defining part of the underside of the surge tank, and the lower and upper portions are coupled to each other and
(ii) a frangible element-replacement configuration in which the upper portion is connected to the venting tank structure and the lower portion is de-coupled from the upper portion, such that the frangible overpressure protector element can be replaced without removal of the upper portion from the venting tank structure.

2. A venting tank structure according to claim 1, wherein the upper portion is also connected to the venting tank structure when the stack pipe unit is in the fitted configuration.

3. A venting tank structure according to claim 2, wherein the stack pipe unit is arranged such that, when the stack pipe unit is in the fitted configuration, the lower portion is held in a relationship with the upper portion so as to form a seal between the frangible overpressure protector element, and the upper and lower portions.

4. A venting tank structure according to claim 3, wherein, in the fitted configuration the frangible overpressure protector element is held between the lower portion and the upper portion as a press-fit.

5. A venting tank structure according to claim 1, wherein the lower portion is attached to the venting tank structure when the stack pipe unit is in the replacement configuration.

6. A venting tank structure according to claim 5, wherein the lower portion is pivotably mounted on the venting tank structure so as to be moveable between its respective positions in the fitted configuration and in the replacement configuration.

7. A venting tank structure according to claim 1, wherein the lower portion is detached from the venting tank structure when the stack pipe unit is in the replacement configuration.

8. A venting tank structure according to claim 1, wherein the lower portion is attachable to the venting tank structure via a re-useable fastener.

9. A venting tank structure according to claim 1, wherein the stack pipe unit is arranged such that, in the replacement configuration, the frangible overpressure protector element is associated with the lower portion.

10. An aircraft venting tank structure having a stack pipe unit associated therewith, wherein
   the stack pipe unit comprises a lower portion and an upper portion, and the stack pipe unit houses a frangible overpressure protector element, the frangible overpressure protector element being arranged, during use, to inhibit fluid flow through the stack pipe unit, but to fail in response to an excessive pressure differential,
   and wherein
the stack pipe unit is arranged to have:
   (i) a frangible element-replacement configuration in which the lower portion of the stack pipe is de-coupled from the upper portion of the stack pipe such that the frangible overpressure protector element can be replaced, and
   (ii) a fitted configuration in which the lower portion of the stack pipe unit is attached to the venting tank structure and extends upwardly from a panel section defining part of the underside of the venting tank structure, the lower portion is coupled to the upper portion, and the upper portion is coupled connected to another part of the venting tank structure,
the stack pipe unit being arranged such that when the stack pipe unit is in the fitted configuration, the lower portion is held in a relationship with the upper portion so as to form a seal between the frangible overpressure protector element, and the lower and upper portions.

11. A venting tank structure according to claim 10 wherein, when the stack pipe unit is in the fitted configuration, the frangible element is held as a press-fit between the lower and upper portions.

12. A venting tank structure according to claim 11, wherein the upper portion of the stack pipe is fixedly mounted to an upper wall of the venting tank structure.

13. A venting tank structure according to claim 1, wherein the frangible overpressure protector element comprises a seal element for forming a seal between the frangible overpressure protector element and at least one of the lower or upper portions of the stack pipe unit.

14. A venting tank structure according to claim 1, wherein the venting tank structure further comprises a spare frangible overpressure protector element for replacing the frangible element housed in the stack pipe unit.

15. A venting tank structure according to claim 14, wherein the spare frangible overpressure protector element is mounted on the stack pipe unit.

16. A venting tank structure according to claim 15, wherein the spare frangible overpressure protector element is mounted on the lower portion of the stack pipe unit.

17. A venting tank according to claim 14, comprising a plurality of spare frangible overpressure protector elements.

18. An overpressure protector unit for an aircraft comprising:
   a lower portion and an upper portion, and the overpressure protector unit houses a frangible overpressure protector element, the frangible overpressure protector element being arranged, during use, to inhibit fluid flow through the overpressure protector unit, but to fail in response to an excessive pressure differential, and wherein the overpressure protector unit is designed to have
   (i) a fitted configuration in which the lower portion is attachable to a surge tank and extends upwardly from a panel section defining part of an underside of the surge tank, and the lower and upper portions are coupleable to each other and
   (ii) a frangible element-replacement configuration in which the upper portion is connectable to a venting tank structure and the lower portion is de-coupleable from the upper portion, such that the frangible overpressure protector element can be replaced without removal of the upper portion from the venting tank structure;
   wherein the overpressure protector unit further comprises a frangible element holder for holding a spare frangible element for use in the overpressure protector unit;
   and the frangible element holder being located on an upper surface of a panel section of the upper portion and in proximity to the frangible element to provide convenient access to a replaceable frangible element.

19. An overpressure protector unit according to claim 18, further comprising at least one additional frangible element holder for receiving an additional spare frangible element.

20. An overpressure protector unit according to claim 18, wherein the overpressure protector is a stack pipe unit for use in an aircraft venting tank.

21. An aircraft venting tank structure comprising the overpressure protector unit according to claim 18.

22. An aircraft venting tank according to claim 21, further comprising a spare frangible element held in the frangible element holder.

23. An aircraft wing structure including the venting tank structure according to claim 1.

24. An aircraft including the venting tank structure according to claim 1.

25. A stack pipe unit for use in the venting tank structure according to claim 1.

26. A method of removing a frangible overpressure protector element from a stack pipe unit in a venting tank, the stack pipe unit comprising a lower portion and an upper portion, the method comprising the steps of:
   separating the lower portion of the stack pipe unit from the upper portion of the stack pipe unit,
   moving the lower to a replacement configuration in which the frangible element may be removed, whilst the upper portion of the stack pipe unit remains in the interior of the venting tank, and
   removing the frangible overpressure protector element from the stack pipe unit.

27. A method of fitting a frangible overpressure protector element in a stack pipe unit in a venting tank, the stack pipe unit comprising a lower portion and an upper portion, the method comprising the steps of:
   locating the frangible overpressure element in the stack pipe unit,
   bringing the lower and upper portions of the stack pipe unit together to a fitted configuration in which the frangible overpressure protector element is arranged to inhibit fluid flow through the stack pipe unit, but to fail in response to an excessive pressure differential,
   the step of bringing the upper and lower portions together forming a seal between the frangible overpressure protector element and the lower and upper portions, the seal being formed whilst the frangible overpressure protector element is inside the venting tank structure.

28. A method according to claim 26, wherein the method is performed whilst at least one fuel tank of the aircraft in fluid communication with the venting tank, contains fuel or fuel vapour.

29. A method of operating an aircraft having a venting tank structure and an overpressure protector unit associated with the venting tank structure, the method comprising the step of providing a spare frangible element on a frangible element holder being located on an upper surface of a panel section and in proximity to the frangible element in the venting tank structure, the spare frangible element being for use in the overpressure protector unit.

30. A frangible overpressure protector element for use in the aircraft venting tank structure according to claim 1, the frangible overpressure protector element comprising a frangible element and at least one sealing element associated with the frangible element.

31. An overpressure protector unit according to claim 19, further including a frangible element received in the overpressure protector for inhibiting fluid flow through the overpressure protector, but for failing in response to an excessive pressure differential.

32. A method according to claim 27, wherein the method is performed whilst at least one fuel tank of the aircraft in fluid communication with the venting tank, contains fuel or fuel vapour.

33. An aircraft surge tank having a stack pipe unit associated therewith, wherein
the stack pipe unit defines an upright cylindrical structure and comprises separable lower and upper portions, and the stack pipe unit housing a frangible overpressure protector element, the frangible overpressure protector element being arranged, during use, to inhibit fluid flow through the stack pipe unit, but to fail in response to an excessive pressure differential,
and wherein
the stack pipe unit is arranged to have
(i) a fitted configuration in which the lower portion is attached to the surge tank and extends upwardly from a panel section forming part of the underside of the surge tank, and the lower and upper portions are coupled to each other and
(ii) a frangible element-replacement configuration in which the upper portion remains attached to the venting tank structure and the lower portion is de-coupled from the upper portion, such that the frangible overpressure protector element can be replaced without removal of the upper portion from the venting tank structure.

* * * * *